United States Patent
Watanabe

(10) Patent No.: US 7,681,060 B2
(45) Date of Patent: Mar. 16, 2010

(54) SEMICONDUCTOR INTEGRATED CIRCUIT DEVICE AND IC CARD EQUIPPED WITH THE SAME HAVING TRANSISTOR SWITCH FOR DISCONNECTING CONTACT POWER DURING CONTACTLESS MODE

(75) Inventor: Kazuki Watanabe, Hino (JP)

(73) Assignee: Renesas Technology Corp., Tokyo (JP)

( * ) Notice: Subject to any disclaimer, the term of this patent is extended or adjusted under 35 U.S.C. 154(b) by 617 days.

(21) Appl. No.: 11/606,028

(22) Filed: Nov. 30, 2006

(65) Prior Publication Data
US 2007/0127185 A1 Jun. 7, 2007

(30) Foreign Application Priority Data
Dec. 5, 2005 (JP) ............................. 2005-350133

(51) Int. Cl.
*G06F 1/28* (2006.01)
(52) U.S. Cl. ..................................... 713/340; 235/492
(58) Field of Classification Search ................. 713/340; 235/492
See application file for complete search history.

(56) References Cited

U.S. PATENT DOCUMENTS 6,199,763 B1 * 3/2001 Thuringer et al. ........... 235/492
7,246,750 B2 * 7/2007 Cho ............................ 235/492
2003/0230631 A1 12/2003 Tsunoda et al.
2008/0054721 A1 * 3/2008 Frew et al. ..................... 307/52

FOREIGN PATENT DOCUMENTS

JP 2000-113148 A 4/2000
JP 2004-78898 A 3/2004

* cited by examiner

*Primary Examiner*—Albert Wang
(74) *Attorney, Agent, or Firm*—Miles & Stockbridge P.C.

(57) ABSTRACT

There is a need for turning off a transistor in a power supply switch circuit irrespective of relative potential relationship between a contact power supply terminal and an internal power supply line and making it possible to decrease an on-resistance of an MOS transistor without increasing the size of the MOS transistor constituting the power supply switch circuit. The power supply switch circuit is comprised of two PMOS transistors whose gate terminals connect with two pull-up circuits. A charge pump circuit generates a negative voltage and is connected to a pull-down circuit. The pull-down circuit is connected to the gate terminals in common. During a contactless operation, the pull-up circuit short-circuits one gate terminal to a contact power supply terminal VDD and the other gate terminal to an internal power supply line VDDA. During a contact operation, the pull-up circuit supplies both gate terminals with a negative voltage from the charge pump circuit.

9 Claims, 11 Drawing Sheets

US 7,681,060 B2

SEMICONDUCTOR INTEGRATED CIRCUIT DEVICE AND IC CARD EQUIPPED WITH THE SAME HAVING TRANSISTOR SWITCH FOR DISCONNECTING CONTACT POWER DURING CONTACTLESS MODE

CLAIM OF PRIORITY

The present patent application claims priority from Japanese application JP No. 2005-350133 filed on Dec. 5, 2005, the content of which is hereby incorporated by reference into this application.

FIELD OF THE INVENTION

The present invention relates to a power supply control technology appropriately applied to a semiconductor integrated circuit device and the like mounted on an IC card. More specifically, the invention relates to a semiconductor integrated circuit device and an IC card using the same that operate selectively on a power supply voltage generated from an electromagnetic wave received at an antenna provided for the IC card and a power supply voltage supplied from the outside via a contact terminal provided for the IC card.

BACKGROUND OF THE INVENTION

There is an IC card that can function both as a contact IC card and a contactless IC card. When the IC card is used as a contact IC card, it uses a power supply voltage supplied from an external voltage supply via a contact power supply terminal. When the IC card is used as a contactless IC card, it uses a power supply voltage generated from an electromagnetic wave received at an antenna. Either one of a power supply voltage is supplied to a circuit mounted in the IC card via an internal power supply line.

According to a technology (e.g., see patent document 1: Japanese Patent Laid-open No. 2000-113148), such dual-purpose IC card uses a power supply switch circuit between a contact power supply terminal and an internal power supply line. When the IC card operates on a power supply generated from an electromagnetic wave received at an antenna, the IC card turns off an input from a contact power supply terminal.

According to another technology (e.g., see patent document 2: Japanese Patent Laid-open No. 2004-78898), a power supply switch circuit includes two serially connected PMOS transistors when the IC card is used as a contactless one. This aims at ensuring removal of the power from a contact power supply terminal of an internal power supply line. Serially connecting two PMOS transistors prevents generation of an electric current path due to a parasitic diode generated between bulk and source terminals of the PMOS transistor. This ensures removal of the power. Further, patent document 2 describes that a transistor for the power supply switch circuit is sized 700 times larger than a logical transistor in terms of an area ratio so as to reduce that transistor's on-resistance.

SUMMARY OF THE INVENTION

A contact IC card includes a semiconductor integrated circuit device functioning as a CPU, memory, and the like. The card surface has a contact terminal connected to the semiconductor integrated circuit device. Such contact IC card is increasingly in widespread use for financing services and the like. The IC card uses the CPU to manage writing, erasing, and reading from the memory. An encryption process is provided to implement an advanced security feature.

On the other hand, there is an increasing use of a contactless IC card in the fields of transportation and the like. The contactless IC card has no power source such as a battery and operates on the power generated from an electromagnetic wave received at an antenna. The contactless IC card receives data that is modulated by and is transmitted from a reader/writer (interrogator). Further, the contactless IC card performs a signal process for the received data and varies a load between antenna terminals in accordance with the processed data. In this manner, the contactless IC card modulates the electromagnetic wave received at the antenna and transmits the data to the reader/writer (interrogator).

An IC card capable of functioning both as a contact IC card and a contactless IC card has multiple power supply input means and selectively uses power supplies that supply power supply voltages. In this case, protective measures need to be taken to avoid a possible short-circuit in the external voltage source or between a contact power supply terminal and a contact ground terminal caused by metal contact during a contactless operation. For this purpose, it is necessary to disconnect the other power supply input than the selected power supply. When the power supply switch circuit includes one PMOS transistor, a parasitic diode is generated between bulk and source terminals of the PMOS transistor. Through this parasitic diode, an electric current path is formed between the power supply voltage terminal and an internal power supply line. The internal power supply line cannot be thoroughly disconnected from the contact power supply terminal.

When the power supply switch circuit uses an NMOS transistor, decreasing a power supply voltage supplied from the contact power supply terminal requires a long time to generate a gate voltage large enough to turn on the NMOS transistor. In the meantime, the internal power supply line is not supplied with a sufficient voltage. It becomes difficult to perform the other processes such as operation mode judgment, and a certain amount of time was needed until start of operation of a chip.

When the contact power supply terminal supplies a small power supply voltage, it is necessary to decrease a voltage loss in the power supply switch circuit. For this purpose, the MOS transistor size needs to be increased and the MOS transistor's on-resistance needs to be decreased. Especially when an internal circuit consumes a large power, the transistor size needs to be increased.

Further, decreasing a power supply voltage supplied from the contact power supply terminal decreases a gate-source voltage supplied to an MOS transistor constituting the power supply switch circuit and increases the on-resistance. Consequently, the power supply switch circuit increases a voltage loss. The transistor size needs to be further increased to reduce the on-resistance.

The power supply switch circuit may include two serially connected PMOS transistors. In the related art, both gates are commonly connected, so that the transistor may be incompletely turned off depending on potentials of the contact power supply terminal and the internal power supply line.

It is a first object of the present invention to provide a semiconductor integrated circuit for turning off a transistor in a power supply switch circuit or an IC card using the semiconductor integrated circuit irrespective of relative potential relationship between a contact power supply terminal and an internal power supply line.

It is a second object associated with the first object of the present invention to provide a circuit technology capable of decreasing an on-resistance of an MOS transistor constituting a power supply switch circuit without increasing the MOS transistor size.

It is a third object associated with the second object of the present invention to provide a circuit technology capable of minimizing a time interval needed to start operating a chip.

To achieve the first object, a semiconductor integrated circuit device and an IC card using the same according to the invention comprises an antenna terminal connected to an antenna, a power supply circuit for rectifying and smoothing an alternate current signal supplied to the antenna terminal from the antenna to obtain a direct current voltage, first and second power supply terminals supplied with electric power from an external apparatus, a power supply switch circuit connected between the first power supply terminal and an output terminal of the power supply circuit, and an internal circuit operating on a voltage generated at the output terminal of the power supply circuit. The power supply switch circuit includes first and second MOS transistors serially connected between the first power supply terminal and the output terminal of the power supply circuit, a first pull-up circuit connected to a gate terminal of the first MOS transistor, and a second pull-up circuit connected to a gate terminal of the second MOS transistor. When the alternate current signal is obtained from the antenna, the first pull-up circuit short-circuits the gate terminal of the first MOS transistor to the first power supply terminal and the second pull-up circuit short-circuits the gate terminal of the second MOS transistor to the output terminal of the power supply circuit. When no alternate current signal is obtained from the antenna, the first and second pull-up circuits stop operating and potentials at the gate terminals of the first and second MOS transistors become setup potentials that are set up in a direction from a potential at the first power supply terminal to a potential at the second power supply terminal.

To achieve the second object, the power supply switch circuit further includes a pull-down circuit connected to the gate terminals of the first and second MOS transistors, and a charge pump circuit connected to the pull-down circuit. The charge pump circuit generates a voltage having a potential exceeding a potential at the second power supply terminal in a direction from a potential at the first power supply terminal to a potential at the second power supply terminal. When no alternate current signal is obtained from the antenna, the pull-down circuit sets up potentials at the gate terminals of the first and second MOS transistors to be setup potentials for a voltage generated by the charge pump circuit.

To achieve the third object, the pull-down circuit sets up a potential at the gate terminals to be a ground potential until a voltage generated by the charge pump circuit exceeds the potential at the second power supply terminal after the charge pump circuit starts operating.

According to the invention, a transistor in a power supply switch circuit can be turned off irrespective of relative potential relationship between a contact power supply terminal and an internal power supply line. In addition, the invention makes it possible to decrease an on-resistance of an MOS transistor without increasing the size of the MOS transistor constituting the power supply switch circuit. Further, the invention can minimize a time interval needed to start operating a chip.

These and other objects and many of the attendant advantages of the invention will be readily appreciated as the same becomes better understood by reference to the following detailed description when considered in connection with the accompanying drawings.

BRIEF DESCRIPTION OF THE DRAWINGS

Embodiments of the present invention will be described in detail based on the following figures, wherein.

DETAILED DESCRIPTION OF THE PREFERRED EMBODIMENTS

The following describes in more detail the semiconductor integrated circuit device and the IC card according to the invention with reference to an embodiment shown in the accompanying drawings.

Figure 1:
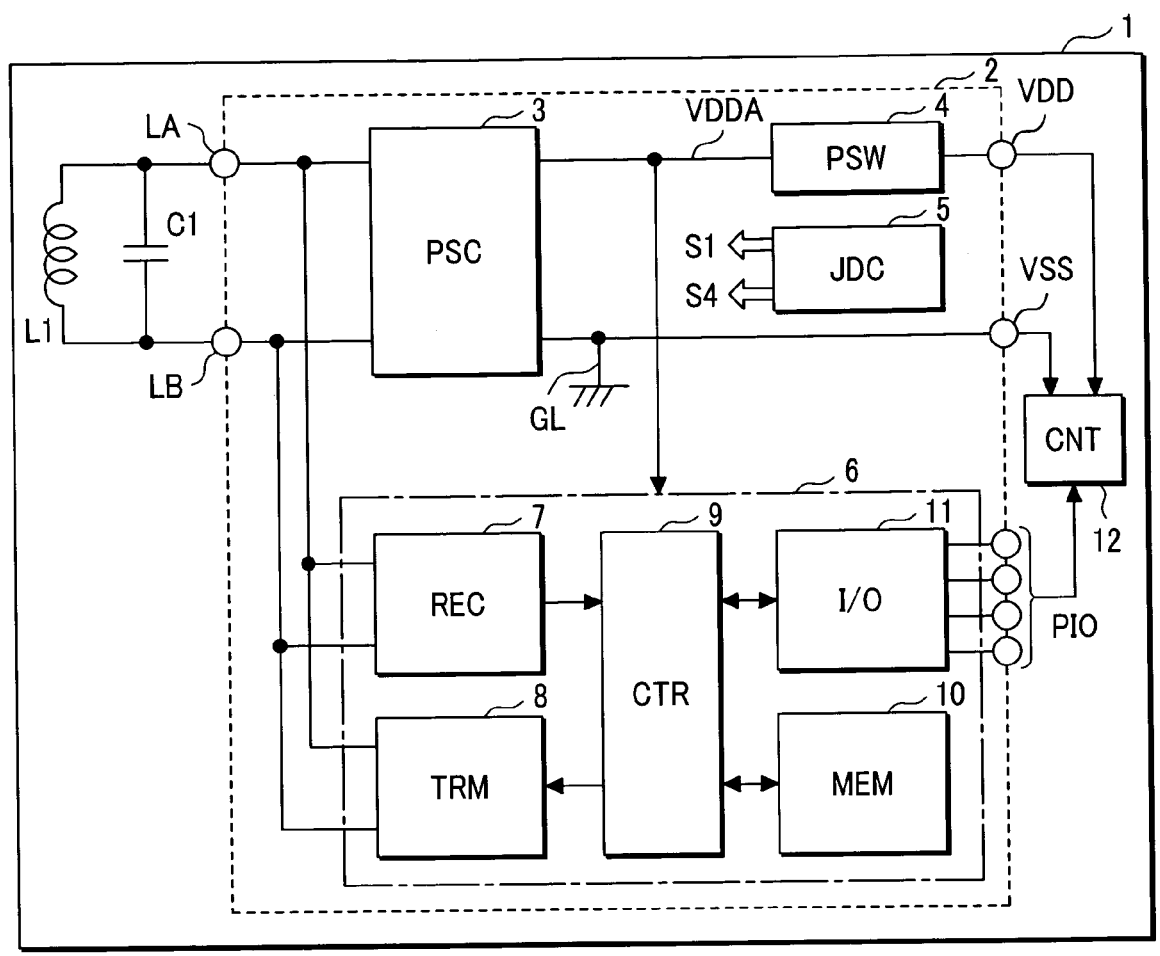
FIG. 1 is a basic construction diagram illustrating an embodiment of a semiconductor integrated circuit device and an IC card according to the invention.

FIG. 1 is a basic construction diagram illustrating an embodiment of the semiconductor integrated circuit device and the IC card according to the invention.

In FIG. 1, reference numeral 1 denotes an IC card; 2 denotes a semiconductor integrated circuit device mounted on the IC card 1; and L1 denotes an antenna mounted on the IC card 1. A capacitor CA connected to the antenna L1 constructs a resonance circuit. The resonance capacitor CA is adjusted in consideration for a parasitic capacitor or the like and need not be always connected. The semiconductor integrated circuit device 2 includes a power supply circuit (PSC) 3, a power supply switch circuit (PSW) 4, a contact/contactless judgment circuit (JDC) 5, and an internal circuit 6. The semiconductor integrated circuit device 2 further includes: antenna terminals LA and LB for connection with the antenna L1; a contact power supply terminal (hereafter simply referred to as a power supply terminal) VDD (first power supply terminal) connected to a contact terminal (CNT) 12 for connection with the outside; a contact ground terminal (hereafter simply referred to as a ground terminal) VSS (second power supply terminal); and a signal input/output terminal PIO.

Figure 2:
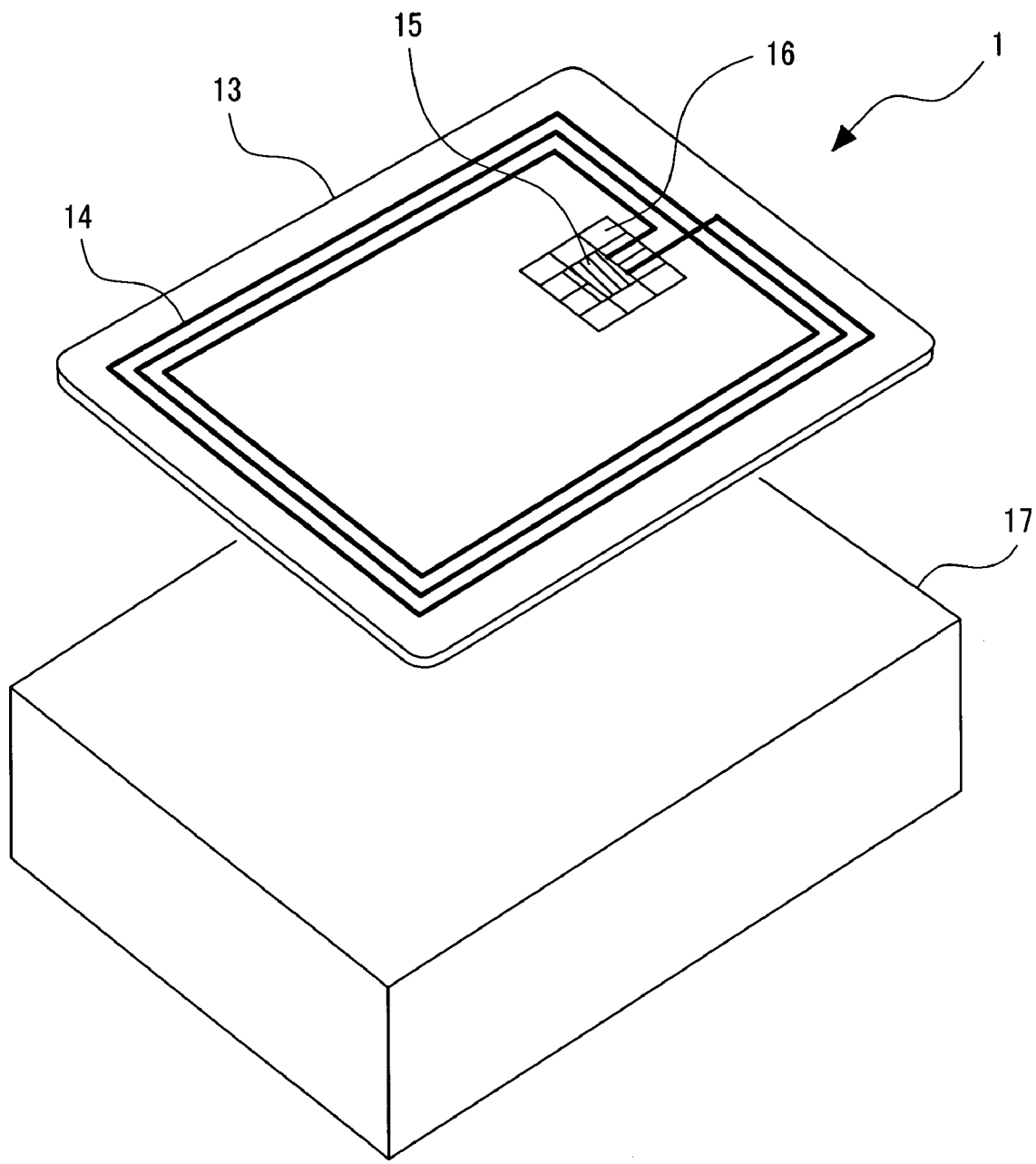
FIG. 2 is a perspective view showing the IC card according to the invention.

FIG. 2 shows the structure of the IC card 1. The IC card 1 is shaped into a card using a resin-molded printed circuit board 13. The antenna L1 receives an electromagnetic wave from an external reader/writer 17 and is constructed as a spiral coil 14 formed by a wiring on the printed circuit board 13. The contact terminal 12 is constructed by a metal terminal 16 on the surface of the IC card 1. The semiconductor integrated circuit device 2 is constructed by one IC chip 15. The coil 14 functioning as the antenna is connected to the IC chip 15 via the antenna terminals LA and LB on the chip. The metal terminal 16 is connected to the IC chip 15 via the power supply terminal VDD, the ground terminal VSS, and the signal input/output terminal PIO on the chip. The antenna L1 receives an electromagnetic wave from the reader/writer 17 and outputs a high-frequency alternate current signal to the antenna terminals LA and LB. The alternate current signal (hereafter referred to as AC signal) is partially modulated by information signal (data).

Though not specified, a well-known semiconductor integrated circuit device manufacturing technology is used to form the semiconductor integrated circuit device 2 on one semiconductor substrate such as monocrystal silicon.

In FIG. 1, the power supply circuit 3 includes a rectifier and a smoothing capacitor. Obviously, the power supply circuit 3 may be provided with a regulator function for controlling an output voltage so as not to exceed a specified voltage level.

An output voltage from the power supply circuit 3 or a voltage fed from the power supply terminal VDD via the power supply switch circuit 4 is supplied as a power supply voltage to the internal circuit 6 via the internal power supply line VDDA. The semiconductor integrated circuit device 2 is internally grounded through a ground line GL.

The contact/contactless judgment circuit 5 detects a power supply source to judge an operation state using the contact terminal 12 (contact mode) or an operation state using the antenna L1 (contactless mode) and then outputs a judgment signal S1. The contact/contactless judgment circuit 5 outputs not only the judgment signal S1, but also a judgment signal S4 for representing judgment settlement. The judgment settlement is issued when the antenna L1 is ready for stably receiving an electromagnetic wave.

The contact/contactless judgment circuit 5 outputs the judgment signal S1 to turn on or off a switch of the power supply switch circuit 4. In the contact mode, the power supply switch circuit 4 supplies the internal circuit 6 with a power supply voltage input to the contact terminal 12. In the contactless mode, the power supply switch circuit 4 disables a power supply from the contact terminal 12.

The internal circuit 6 includes a receiver (REC) 7, a transmitter (TRM) 8, a controller (CTR) 9, memory (MEM) 10, and an I/O circuit (I/O) 11. The receiver 7 demodulates an information signal superimposed on an AC signal received at the antenna L1 provided for the IC card, outputs digital information signal, and supplies the signal to the controller 9. The transmitter 8 receives the digital information signal output from the controller 9 and uses this information signal to modulate the AC signal received at the antenna L1. The reader/writer 17 receives a reflected electromagnetic wave from the antenna L1 and thus receives the information signal from the controller 9 by identifying that the reflected electromagnetic wave is changed by the modulation. The memory 10 is used for recording information data interchanged with the controller 9 and transmission data.

Further, the controller 9 can interchange a signal with an external apparatus via the I/O circuit 11 and the signal input/output terminal PIO. When interchanging a signal via the signal input/output terminal PIO, the internal circuit 6 operates on a power supply voltage supplied from the power supply terminal VDD and the ground terminal VSS.

Figure 3:
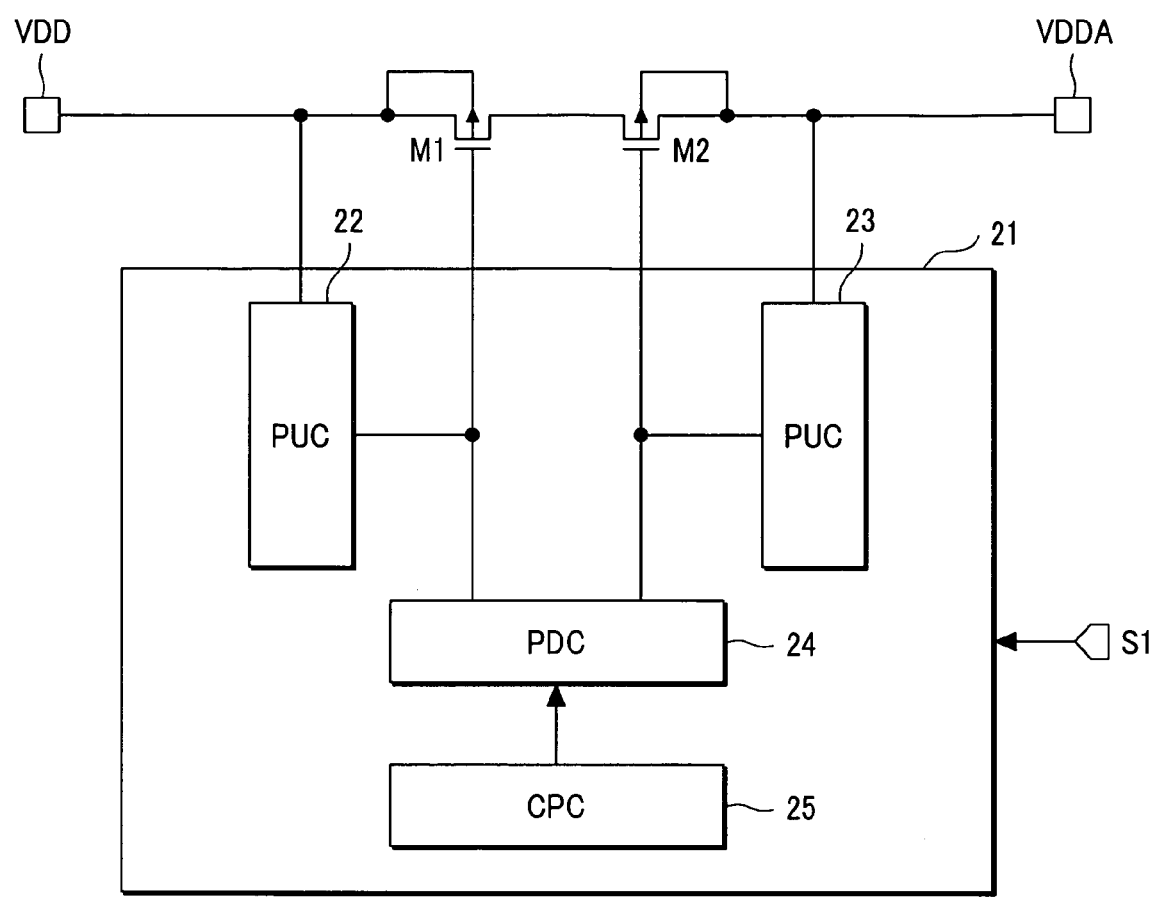
FIG. 3 is a basic construction diagram illustrating a power supply switch circuit mounted on the semiconductor integrated circuit device according to the invention.

FIG. 3 is a basic construction diagram illustrating the power supply switch circuit 4 mounted on the semiconductor integrated circuit device 2.

In FIG. 3, PMOS transistors M1 and M2 construct a switch element that makes connection and disconnection between the power supply terminal VDD and the internal power supply line VDDA. A gate control circuit 21 turns on or off the PMOS transistors M1 and M2. A bulk terminal (well) of the PMOS transistor M1 is connected to the power supply terminal VDD. A bulk terminal (well) of the PMOS transistor M2 is connected to the power supply terminal VDDA.

The gate control circuit 21 includes a pull-up circuit (PUC) 22 and a pull-up circuit (PUC) 23. The pull-up circuit 22 short-circuits a gate terminal of the PMOS transistor M1 to the power supply terminal VDD to increase (pull up) a potential of the gate terminal up to a potential for the power supply terminal VDD. The pull-up circuit 23 short-circuits a gate terminal of the PMOS transistor M2 to the internal power supply line VDDA to pull up a potential for the gate terminal up to a potential of the internal power supply line VDDA. The gate control circuit 21 further includes a pull-down circuit (PDC) 24 and a charge pump circuit (CPC) 25. The pull-down circuit 24 decreases (pulls down) potentials for the gate terminals of the PMOS transistors M1 and M2 to low potentials. The charge pump circuit 25 generates a negative voltage. When the judgment signal S1 is input to the gate control circuit 21, the judgment signal S1 controls operations of the pull-up circuits 22 and 23, the pull-down circuit 24, and the charge pump circuit 25. As shown in FIG. 1, the judgment signal S1 is output from the contact/contactless judgment circuit 5.

In the contactless mode, the pull-down circuit 24 stops operating and the pull-up circuits 22 and 23 operate, and then the PMOS transistors M1 and M2 turn off. In this manner, the power supply terminal VDD can be disconnected from the internal power supply line VDDA independently of relative relationship between potentials for the power supply terminal VDD and the internal power supply line VDDA. Since a negative becomes unnecessary, the charge pump circuit 25 stops operating.

In the contact mode, the pull-up circuits 22 and 23 stop operating and the pull-down circuit 24 operates, and then the PMOS transistors M1 and M2 turn on. At this time, the charge pump circuit 25 operates to generate a negative voltage. The negative voltage is then supplied to the gate terminals of the PMOS transistors M1 and M2 to increase a gate-source voltage for the PMOS transistors M1 and M2. This decreases the on-resistance for the PMOS transistors M1 and M2. It is possible to decrease a voltage loss in the PMOS transistors M1 and M2 due to an electric current consumed in a circuit connected to the internal power supply line VDDA.

Shortly after the charge pump circuit 25 starts operating, an output voltage of the charge pump circuit 25 may be higher than a potential of the ground line GL (hereafter referred to as a ground potential). In such case, the pull-down circuit 24 connects the gate terminals of the PMOS transistors M1 and M2 to the ground line GL. When the output voltage of the charge pump circuit 25 becomes lower than the ground potential, the pull-down circuit 24 connects the gate terminals of the PMOS transistors M1 and M2 to the output terminal of the charge pump circuit 25.

An output voltage of the charge pump circuit 25 does not lower sufficiently immediately after the power supply terminal VDD supplies a power supply voltage. Even in such case, the PMOS transistors M1 and M2 turn on. The internal power supply line VDDA is supplied with a sufficient power supply voltage for judgment of the operation modes and the like. It is possible to shorten a time interval before the chip starts operating.

When the internal circuit 6 consumes a small amount of electric current, the power supply switch circuit 4 is subject to a small voltage loss. In this case, the charge pump circuit 25 can be omitted. A voltage to be pulled down can be adjusted to the ground or a potential in the middle of the internal power supply line VDDA and the ground. In this case, NMOS transistors M9 through M11 and the charge pump circuit 25 are omitted from FIG. 4A to be described. And, source terminals of the NMOS transistors M7 and M8 are connected to the ground line GL or a voltage division point. For example, the voltage division point may be equivalent to a connection point between two resistors serially connected between the internal power supply line VDDA and the ground line GL.

As mentioned above, potentials at the gate terminals of the PMOS transistors M1 and M2 in the contact mode correspond to the positive potential, the ground potential, or the intermediate potential at the voltage division point depending on connections. These potentials are hereafter referred to as setup potentials that are set up in the direction from a potential of the power supply terminal VDD to a potential of the ground terminal VSS. At this time, the negative potential of a voltage generated from the charge pump circuit 25 becomes a setup potential that exceeds a potential of the second power supply terminal in the direction from the potential of the first power supply terminal to the potential of the second power supply terminal.

Figure 4A:
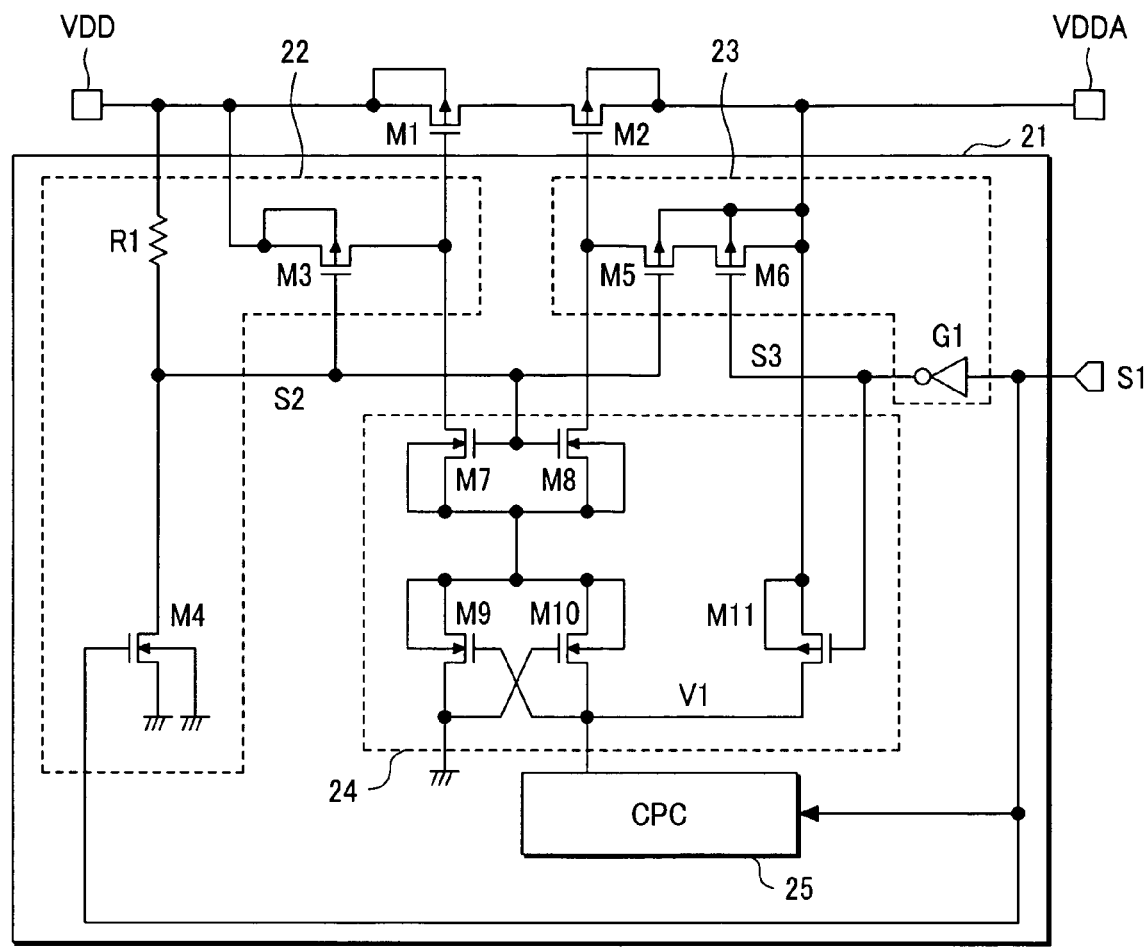
FIG. 4A is a circuit diagram showing an example of the power supply switch circuit mounted on the semiconductor integrated circuit device according to the invention.

FIG. 4A is a circuit diagram showing an example of the power supply switch circuit 4 mounted on the semiconductor integrated circuit device 2 according to the embodiment. FIG. 4A shows a specific circuit construction of FIG. 3.

The pull-up circuit 22 in FIG. 3 is composed of a PMOS transistor M3, an NMOS transistor M4, and a resistor R1. The judgment signal S1 is input to a gate terminal of the NMOS transistor M4. The NMOS transistor M4 and the resistor R1 invert the judgment signal S1. The judgment signal S1 is converted into a judgment signal S2 in terms of an output signal level and is input to the gate terminal of the PMOS transistor M3. When the judgment signal S1 is "H" (contactless mode), the judgment signal S2 turns to "L." The PMOS transistor M3 turns on to pull up the potential at the gate terminal of the PMOS transistor M1 to the potential of the power supply terminal VDD.

The pull-up circuit 23 in FIG. 3 includes PMOS transistors M5 and M6 and an inverter circuit G1. A gate terminal of the PMOS transistor M5 is supplied with the judgment signal S2. A gate terminal of the PMOS transistor M6 is supplied with a judgment signal S3 resulting from the judgment signal S1 invented by the inverter circuit G1. When the judgment signal S1 is "H" (contactless mode), the judgment signals S2 and S3 turn to "L." The PMOS transistors M5 and M6 turn on to pull up the potential at the gate terminal of the PMOS transistor M2 to the potential of the internal power supply line VDDA.

The pull-down circuit 24 in FIG. 3 is composed of NMOS transistors M7, M8, M9, M10, and a PMOS transistor M11. Gate terminals of the NMOS transistors M7 and M8 are supplied with the judgment signal S2. The NMOS transistors M9 and M10 compare an output voltage V1 from the charge pump circuit 25 with the ground voltage and supply a lower voltage to source terminals of the NMOS transistors M7 and M8. When the judgment signal S1 prevents the charge pump circuit 25 from operating (contact mode), the PMOS transistor M11 pulls up the potential at the output terminal of the charge pump circuit 25 to the potential of the internal power supply line VDDA.

Figure 4B:
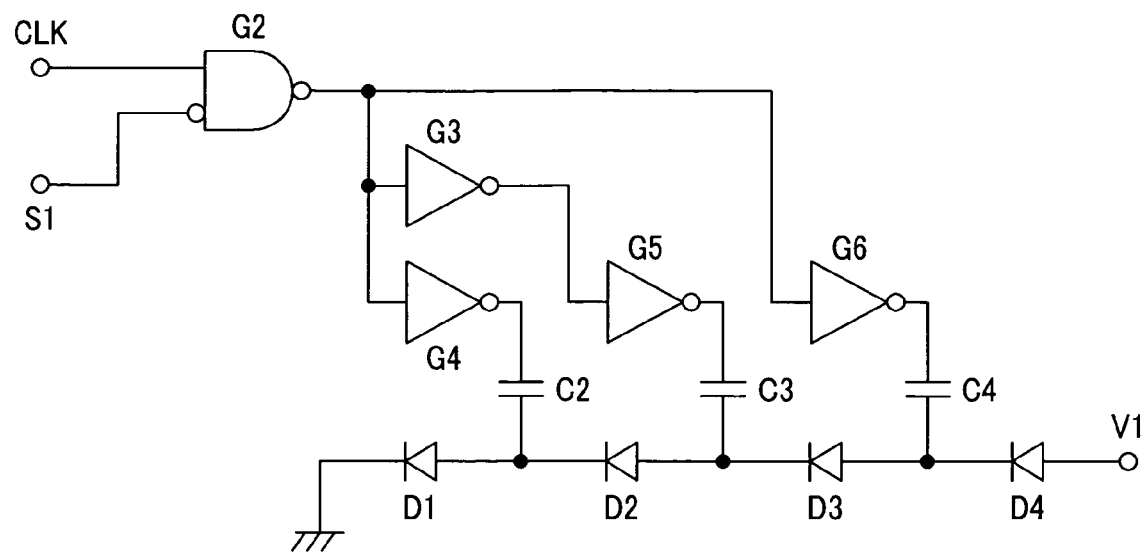
FIG. 4B is a circuit diagram showing an example of a charge pump circuit in the power supply switch circuit of FIG. 4A.

FIG. 4B shows an example of the charge pump circuit in FIG. 4A. In the contact mode where the judgment signal S1 turns to "L," a clock signal (CLK) is input from the contact terminal 12 via the signal input/output terminal PIO and is supplied to capacitors C2 through C4 for charging via a NAND circuit G2 and inverter circuits G3 through G6. And then, turning off the clock signal discharges electric charges applied to the capacitors C2 through C4. At the same time, diodes D1 through D3 become nonconductive to add voltages based on electric charges in the capacitors. An anode terminal of the diode D4 outputs a large negative voltage V1.

Figure 4C:
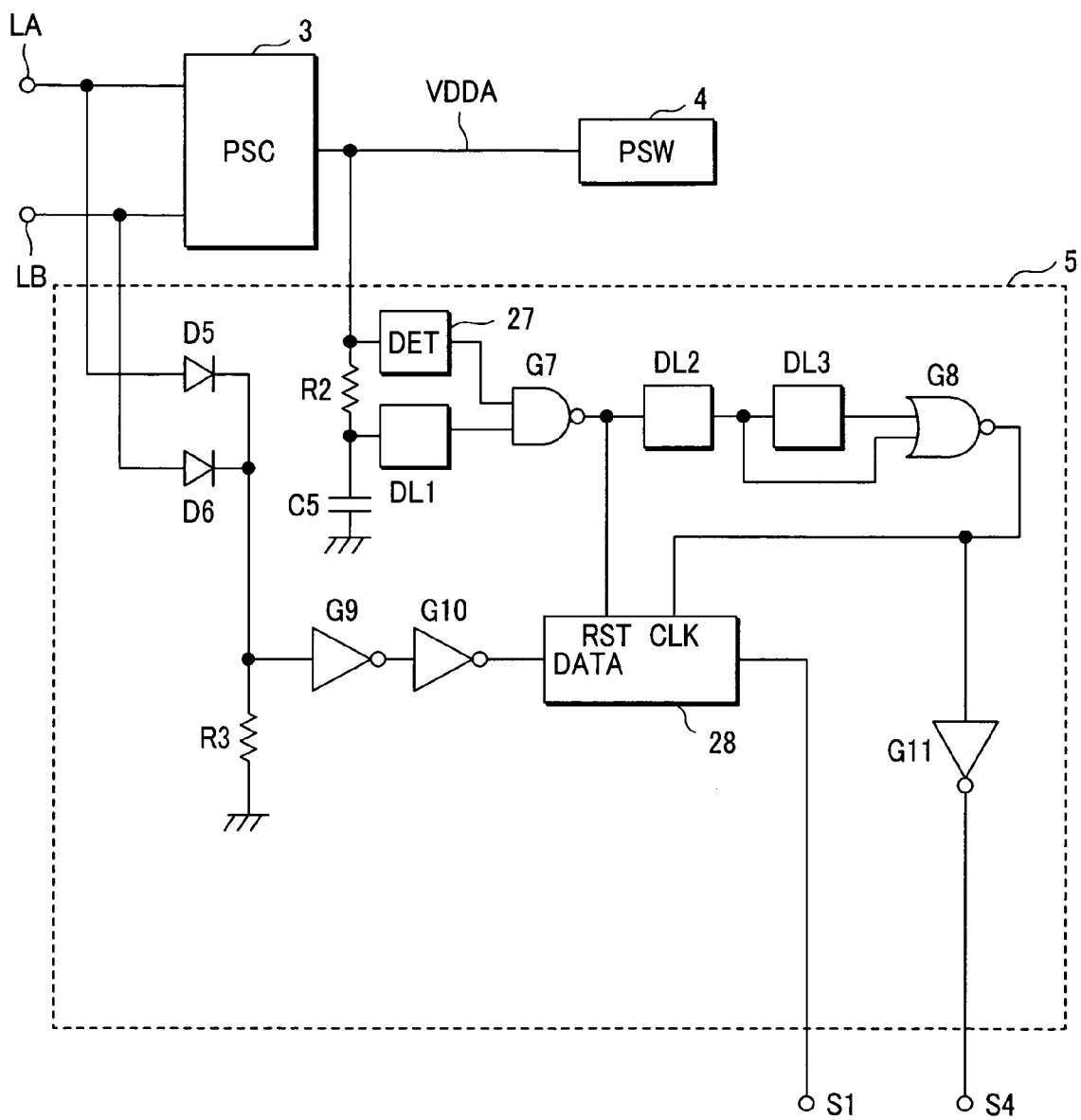
FIG. 4C is a circuit diagram showing an example of a judgment circuit in the semiconductor integrated circuit device of FIG. 1.

FIG. 4C shows an example of the contact/contactless judgment circuit 5 in FIG. 1. The NAND circuit G7 outputs a reset pulse (RST) by NANDing a voltage from a voltage detector (DET) 27 for detecting a voltage occurrence in the internal power supply line VDDA and a voltage that occurs in the internal power supply line VDDA and is output via a time constant circuit and a delay circuit DL1. The time constant circuit is composed of a resistor R2 and a capacitor C5. The reset pulse passes through a delay circuit DL2, a delay circuit DL3, and a NOR circuit G8, and becomes a clock pulse (CLK) after time T1. The time T1 is set as a time when a direct current voltage (hereafter referred to as DC voltage) obtained from the electromagnetic wave received at the antenna L1 during a contactless operation is stabilized and the distinction between the contact mode and the contactless mode can be settled. Diodes D5 and D6 rectify a signal received at the antenna L1 during the contactless operation to generate a DC voltage at a resistor R3. The voltage passes through an inverter G9 and an inverter G10 that generates output data (DATA) set to "H". During a contact operation, no radio wave reaches the antenna L1 and the resistor generates no voltage. And, the inverter G10 outputs data that turns to "L". A latch circuit 28 first turns to "L" based on the reset pulse from the NAND circuit G7. After the time T1, the latch circuit 28 holds output data from the inverter G9 based on the clock pulse. In this manner, the latch circuit 28 outputs the judgment signal S1. That is, until the time T1, the judgment signal S1 is reset to "L". At the time T1 and later, the judgment signal S1 turns to "L" in the contact mode and turns to "H" in the contactless mode. Since the NOR circuit G8 generates a clock pulse at the time T1, the clock pulse is used as a signal indicating settlement of the judgment of the distinction between the contact mode and the contactless mode. The clock pulse passes through an inverter G11 and is output as a judgment signal S4.

Figure 5:
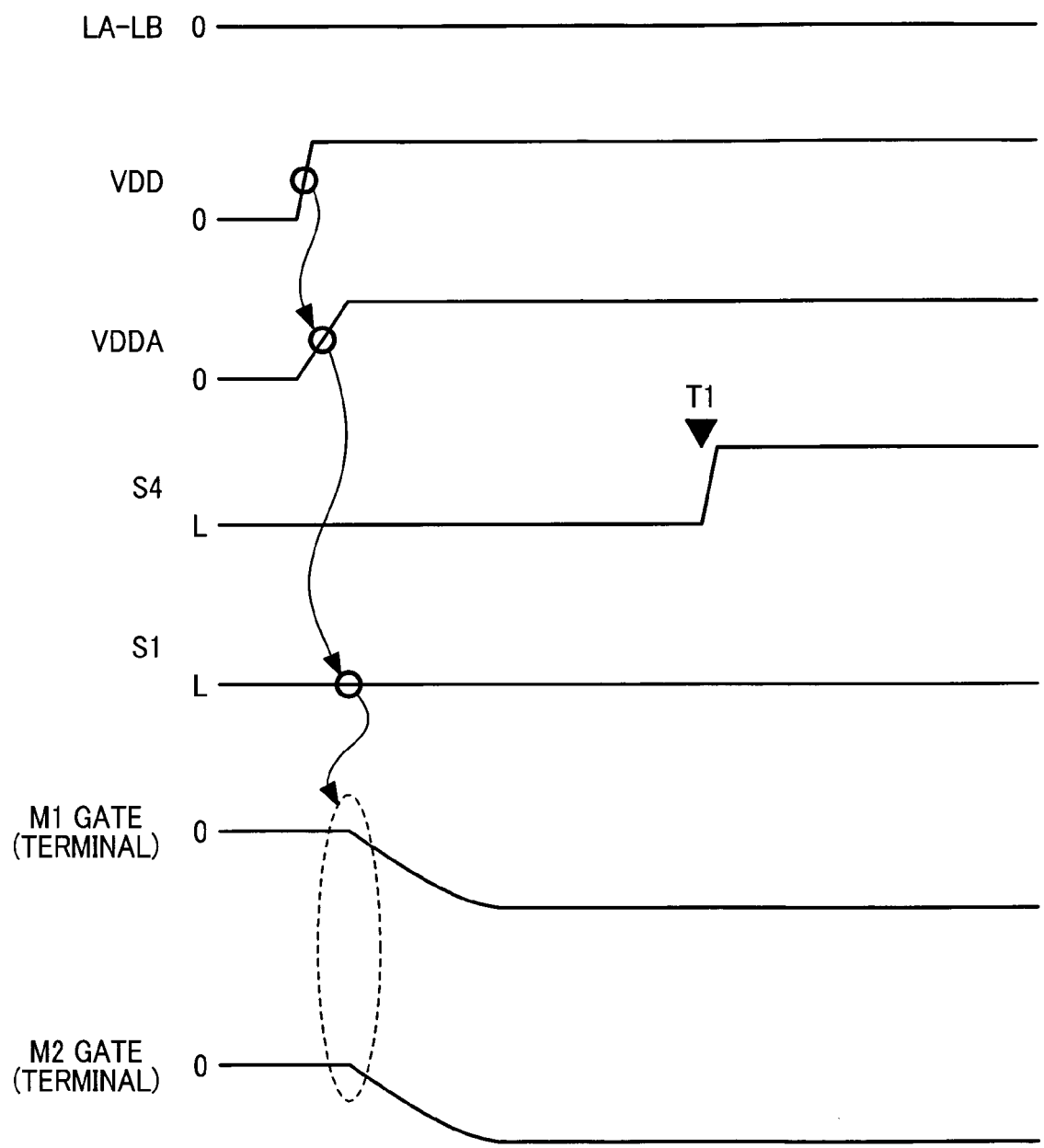
FIG. 5 is a waveform chart showing contact mode operations of the power supply switch circuit in FIG. 4A.

FIG. 5 shows operational waveforms for the components during a contact mode operation of the power supply switch circuit 4 in FIG. 4A mounted on the semiconductor integrated circuit device 2 according to the invention.

When used for communication based on the contactless interface, the antenna L1 receives no electromagnetic wave. No voltage occurs between the antenna terminals LA and LB. When the power supply terminal VDD is supplied with a power supply voltage, the resistor R1 turns off the PMOS transistors M3 and M5 and turns on the NMOS transistors M7 and M8. The gate terminals of the PMOS transistors M1 and M2 are pulled down. Consequently, the internal power supply line VDDA is supplied with the power supply voltage.

As a result, the contact/contactless judgment circuit 5 starts operating. Until the operation mode is judged, the contact/contactless judgment circuit 5 outputs the judgment signal S1 set to "L" indicating the contact mode. This is because the PMOS transistors M1 and M2 need to be turned on so as to supply a constant power to the contact/contactless judgment circuit 5 until the operation mode is judged.

Therefore, when the internal power supply line VDDA is supplied with a power supply voltage, the charge pump circuit 25 starts operating to generate a negative voltage. Accordingly, potentials at the gate terminals of the PMOS transistors M1 and M2 drop toward the negative direction to be able to increase a gate-source voltage.

At the time T1 later on, the contact/contactless judgment circuit 5 judges the operation mode. When the contact mode is judged, the judgment signal S1 maintains the state "L" as is. The PMOS transistors M1 and M2 maintain the on-state.

Figure 6:
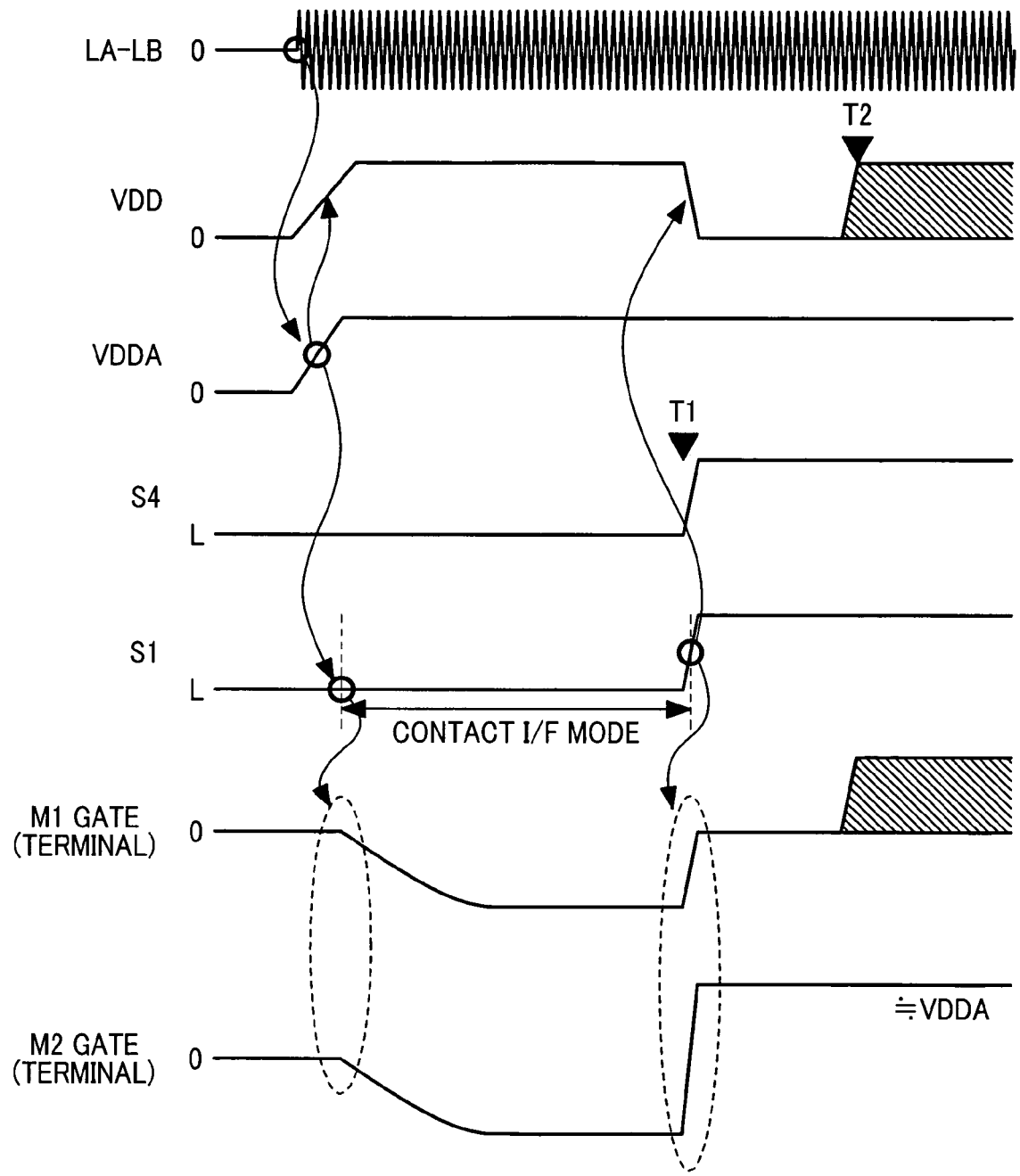
FIG. 6 is a waveform chart showing contactless mode operations of the power supply switch circuit in FIG. 4A.

FIG. 6 shows operational waveforms for the components during a contactless mode operation of the power supply switch circuit 4 in FIG. 4A mounted on the semiconductor integrated circuit device 2 according to the invention.

The antenna L1 is used for communication according to the contactless interface and receives an electromagnetic wave. A voltage occurs between the antenna terminals LA and LB. No voltage is supplied to the power supply terminal VDD.

Let us assume the terminal corresponding to a higher output voltage of the power supply circuit 3 to be an output terminal. Since the output terminal is connected to the internal power supply line VDDA, a power supply voltage occurs on the internal power supply line VDDA. Consequently, the contact/contactless judgment circuit 5 starts operating. As mentioned above, the contact/contactless judgment circuit 5 outputs the judgment signal S1 set to "L" indicating the contact mode until the operation mode is judged. The gate terminals of the PMOS transistors M1 and M2 are pulled down to temporarily turn on the PMOS transistors M1 and M2.

When the operation mode is judged to be contactless mode at the time T1, the judgment signal S1 turns to "H". The gate terminals of the PMOS transistors M1 and M2 are pulled up to turn off the PMOS transistors M1 and M2. The voltage stops being supplied to the power supply terminal VDD. The potential of the power supply terminal VDD decreases accordingly.

The potential at the gate terminal of the PMOS transistor M1 remains being pulled up to the potential of the power supply terminal VDD. As shown in FIG. 6, for example, a voltage is forcibly applied to the power supply terminal VDD at time T2. The potential at the gate terminal of the PMOS transistor M1 nevertheless remains being pulled up to the potential of the power supply terminal VDD. The PMOS transistor M1 always maintains the off-state. In this manner, the power supply terminal VDD can be disconnected from the internal power supply line VDDA independently of relative relationship due to an externally applied voltage between potentials for the power supply terminal VDD and the internal power supply line VDDA.

Figure 7:
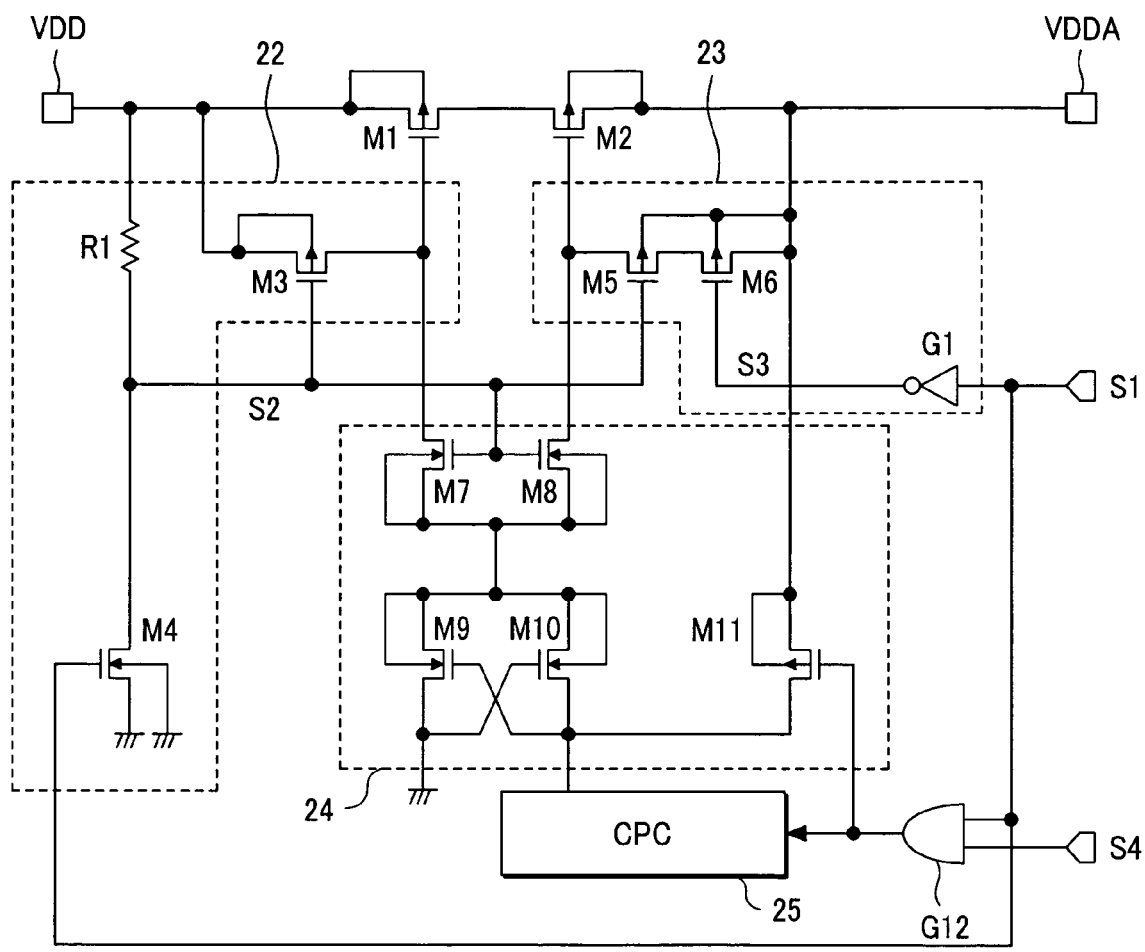
FIG. 7 is a circuit diagram showing another example of the power supply switch circuit mounted on the semiconductor integrated circuit device according to the invention.

FIG. 7 is a circuit construction diagram showing another example of the power supply switch circuit 4 mounted on the semiconductor integrated circuit device 2 according to the invention and shows another specific circuit construction of FIG. 3. The power supply switch circuit 4 in FIG. 7 is modified so as to control the charge pump circuit 25 in FIG. 4A based on an AND signal between the judgment signals S1 and S4. The AND signal is output from an AND circuit G12.

Figure 8:
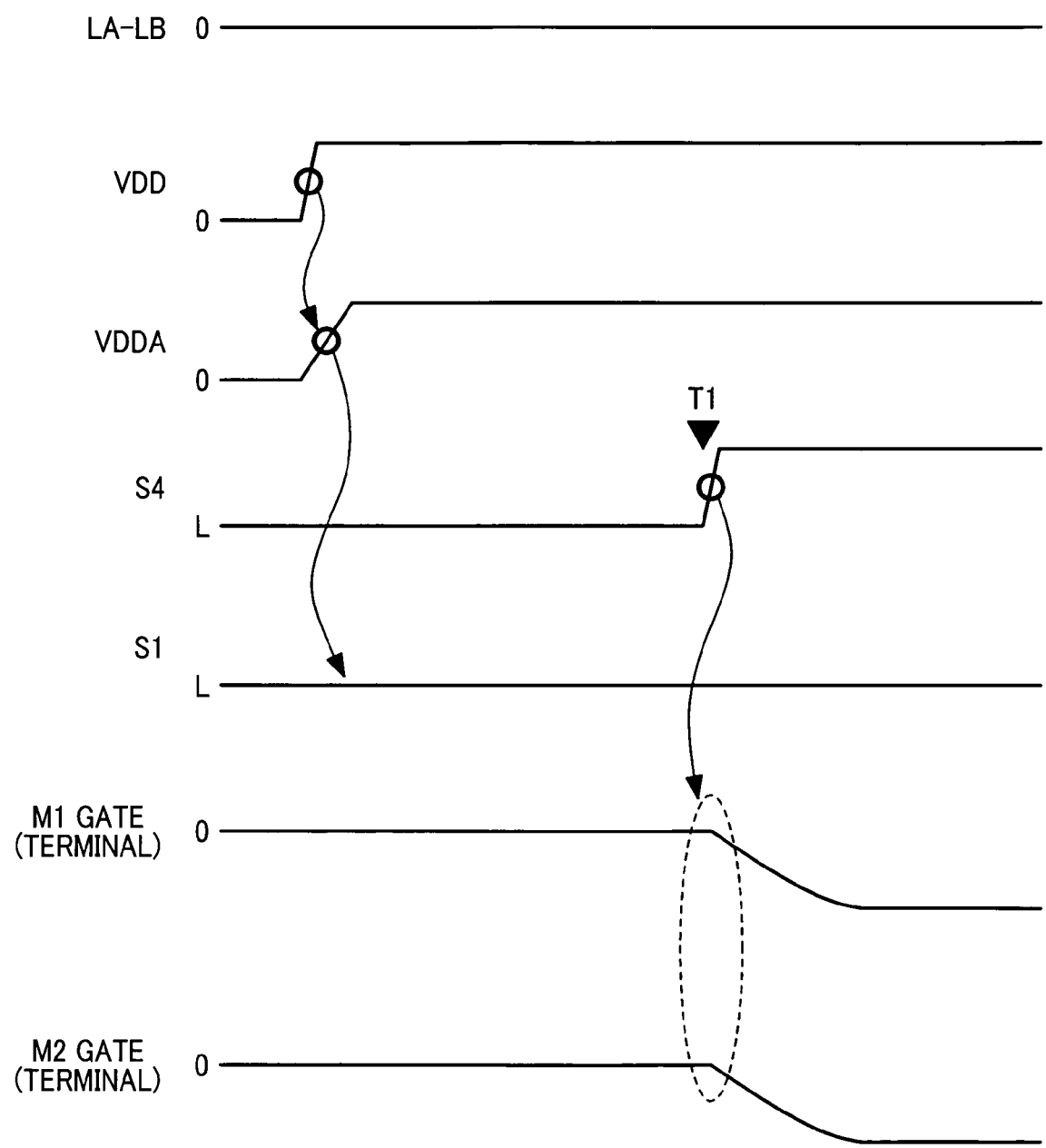
FIG. 8 is a waveform chart showing contact mode operations of the power supply switch circuit in FIG. 7.

FIG. 8 shows operational waveforms for the components during a contact mode operation of the power supply switch circuit 4 mounted on the semiconductor integrated circuit device 2 in FIG. 7 according to the invention. An AND signal between the judgment signals S1 and S4 controls the charge pump circuit 25 so that the charge pump circuit 25 does not start generating a negative voltage till the time (T1) when the contact/contactless judgment circuit judges the operation mode. When the contact/contactless judgment circuit 5 judges the operation mode to be the contact mode, the charge pump circuit 25 starts generating a negative voltage.

Figure 9:
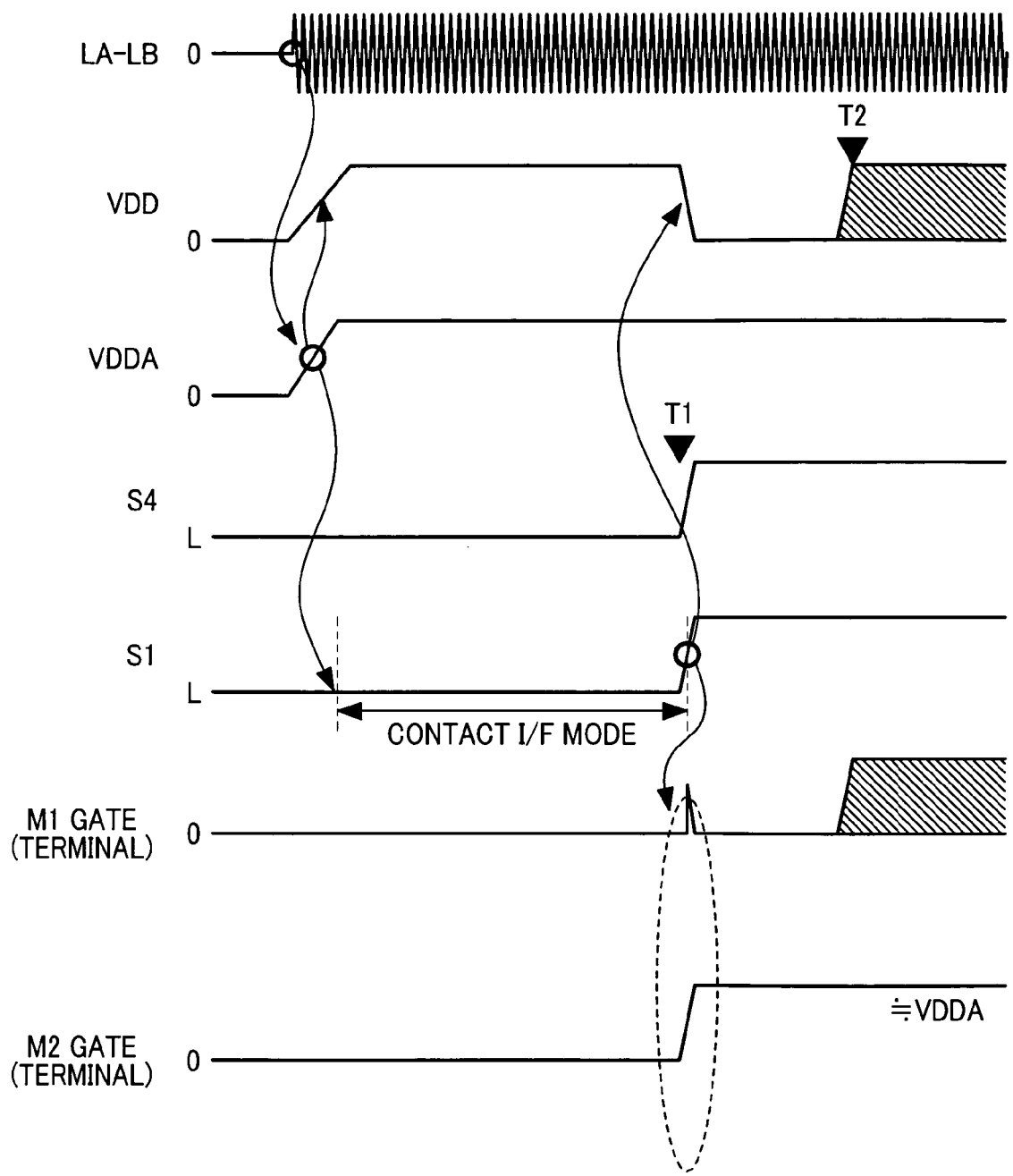
FIG. 9 is a waveform chart showing contactless mode operations of the power supply switch circuit in FIG. 7.

FIG. 9 shows operational waveforms for the components during a contactless mode operation of the power supply switch circuit 4 in FIG. 7 mounted on the semiconductor integrated circuit device 2 according to the invention. As mentioned above, the charge pump circuit 25 does not start generating a negative voltage and remains inactive until the contact/contactless judgment circuit judges the operation mode. When the contact/contactless judgment circuit 5 judges the operation mode to be the contactless mode, the charge pump circuit 25 does not start operating and remains inactive.

Thus, since an AND signal between the judgment signals S1 and S4 controls the charge pump circuit 25, it is possible to continue an operation in the contactless mode without operating the charge pump circuit 25 in the contactless mode. This makes it possible to prevent the power from being consumed unnecessarily.

While there has been described specific preferred embodiments of the present invention, it is to be distinctly understood that the present invention is not limited thereto but may be otherwise variously embodied within the spirit and scope of the invention. For example, the power supply switch circuit 4 in FIG. 1 may include an NMOS transistor, and the power supply switch circuit 4 may be connected to the ground terminal VSS side. In this case, the output terminal of the power supply switch circuit 3 is changed to the terminal corresponding to a lower voltage from the power supply circuit 3, and the power supply terminal VDD is changed to the second power supply terminal. And, the ground terminal VSS is changed to the first power supply terminal. Further, the circuit construction is changed so that the charge pump circuit generates a voltage having a potential higher than a potential at the second power supply terminal, i.e., a positive voltage having the setup potential exceeding the potential at the second power supply terminal in the direction from the potential at the first power supply terminal to a potential at the second power supply terminal.

What is claimed is:

1. A semiconductor integrated circuit device comprising:
    a pair of antenna terminals connected to an antenna;
    a power supply circuit for rectifying and smoothing an alternating current signal supplied to the antenna terminals from the antenna to obtain a direct current voltage;
    first and second power supply terminals supplied with electric power from an external apparatus;
    a power supply switch circuit connected between the first power supply terminal and an output terminal of the power supply circuit; and
    an internal circuit which operates using a voltage generated by the power supply circuit received by the output terminal of the power supply circuit,
    wherein the power supply switch circuit includes:
       first and second MOS transistors serially connected between the first power supply terminal and the output terminal of the power supply circuit;
       a first pull-up circuit connected to a gate terminal of the first MOS transistor;
       a second pull-up circuit connected to a gate terminal of the second MOS transistor; and
       a pull-down circuit connected to the gate terminals of the first and second MOS transistors,
    wherein, when the alternating current signal is obtained from the antenna, the first pull-up circuit short-circuits the gate terminal of the first MOS transistor to the first power supply terminal and the second pull-up circuit short-circuits the gate terminal of the second MOS transistor to the output terminal of the power supply circuit; and wherein, when no alternating current signal is obtained from the antenna, the first and second pull-up circuits stop operating and potentials at the gate terminals of the first and second MOS transistors become one of a plurality of setup potentials that are set so as to track in a direction from a potential at the first power supply terminal to a potential at the second power supply terminal, and wherein, when no alternating current signal is obtained from the antenna, the pull-down circuit sets potentials at the gate terminals of the first and second MOS transistors to one of said setup potentials.

2. The semiconductor integrated circuit device according to claim 1, further comprising:
a judgment circuit that determines presence or absence of the alternating current signal obtained from the antenna,
wherein the judgment circuit controls operations of the first and second pull-up circuits and the pull-down circuit.

3. The semiconductor integrated circuit device according to claim 2,
wherein the power supply switch circuit further includes a charge pump circuit connected to the pull-down circuit;
wherein the charge pump circuit generates a voltage having a setup potential exceeding a potential at the second power supply terminal and which tracks in a direction from a potential at the first power supply terminal to a potential at the second power supply terminal; and
wherein the pull-down circuit sets a potential at the gate terminals of the first and second MOS transistors to the potential for the voltage generated by the charge pump circuit.

4. The semiconductor integrated circuit device according to claim 3,
wherein the pull-down circuit sets potentials at the gate terminals to be a ground potential until a voltage generated by the charge pump circuit exceeds the potential at the second power supply terminal after the charge pump circuit starts operating.

5. The semiconductor integrated circuit device according to claim 3,
wherein the charge pump circuit operates when no alternating current signal is obtained from the antenna terminals.

6. The semiconductor integrated circuit device according to claim 3,
wherein the charge pump circuit operates when no alternating current signal is obtained from the antenna terminals and after the judgment circuit determines presence or absence of the alternating current signal.

7. The semiconductor integrated circuit device according to claim 3,
wherein the first and second MOS transistors are first and second PMOS transistors, respectively;
wherein a bulk terminal of the first PMOS transistor is connected to the first power supply terminal;
wherein a bulk terminal of the second PMOS transistor is connected to an output terminal of the power supply circuit; and
wherein a voltage generated by the charge pump circuit is lower than the potential at the second power supply terminal.

8. The semiconductor integrated circuit device according to claim 3,
wherein the first and second MOS transistors are first and second NMOS transistors, respectively;
wherein a bulk terminal of the first NMOS transistor is connected to the first power supply terminal;
wherein a bulk terminal of the second NMOS transistor is connected to an output terminal of the power supply circuit; and
wherein the voltage generated by the charge pump circuit is higher than the potential at the second power supply terminal.

9. An IC card comprising:
a coil used as an antenna;
a metal terminal for connection to an external apparatus; and
the semiconductor integrated circuit device according to claim 1,
wherein the coil is connected to a pair of antenna terminals of the semiconductor integrated circuit device; and
wherein the metal terminal is connected to first and second power supply terminals of the semiconductor integrated circuit device.

* * * * *